United States Patent [19]
Hoyer et al.

[11] 3,777,147
[45] Dec. 4, 1973

[54] GATED SPECTRAL WELL LOGGING RADIATION DETECTION SYSTEM AND METHOD

[75] Inventors: Wilmer A. Hoyer; Robert C. Rumble; Donald H. Britton, all of Houston, Tex.; John D. Ball, deceased, late of Lubbock, Tex. by Verna D. Ball, executrix

[73] Assignee: Esso Production Research Company, Houston, Tex.

[22] Filed: Feb. 5, 1970

[21] Appl. No.: 13,222

Related U.S. Application Data
[62] Division of Ser. No. 587,943, Oct. 14, 1966, Pat. No. 3,582,655.

[52] U.S. Cl. ............................. 250/264, 250/270
[51] Int. Cl. ............................................. G01v 5/00
[58] Field of Search ................. 250/71.5 R, 83.3 R, 250/83.6 W, 84.5

[56] References Cited
UNITED STATES PATENTS
| | | | |
|---|---|---|---|
| 3,492,481 | 1/1970 | Buck et al. | 250/83.6 W X |
| 3,311,876 | 3/1967 | Lee | 250/83.6 W X |
| 3,379,882 | 4/1968 | Youmans | 250/83.6 W X |

*Primary Examiner*—Archie R. Borchelt
*Attorney*—James A. Reilly, Gary C. Honeycutt, James E. Reed, Charles D. Stores and John S. Schneider

[57] ABSTRACT

A gamma ray well logging system comprising a gated gamma radiation detector system. The components of the gated detector system comprise a surface a.c. power source; first subsurface means adapted to change said a.c. power to d.c., which means includes silicon diode full wave rectifiers; a radiation detector adapted to detect and convert gamma rays to electrical signals; an amplifier powered by said d.c. adapted to amplify said signals, which means includes feedback circuits to reduce distortion of the electrical signals and produce a desired amplifier output impedance; means including a timer powered by said d.c. adapted to produce a positive pulse; means to shape said positive pulse and produce two pulses having amplitudes which produce minimum distortion and high on-off ratio of the radiation detector; and second subsurface means adapted to change said a.c. power source to other d.c. adapted to operate said detector.

6 Claims, 7 Drawing Figures

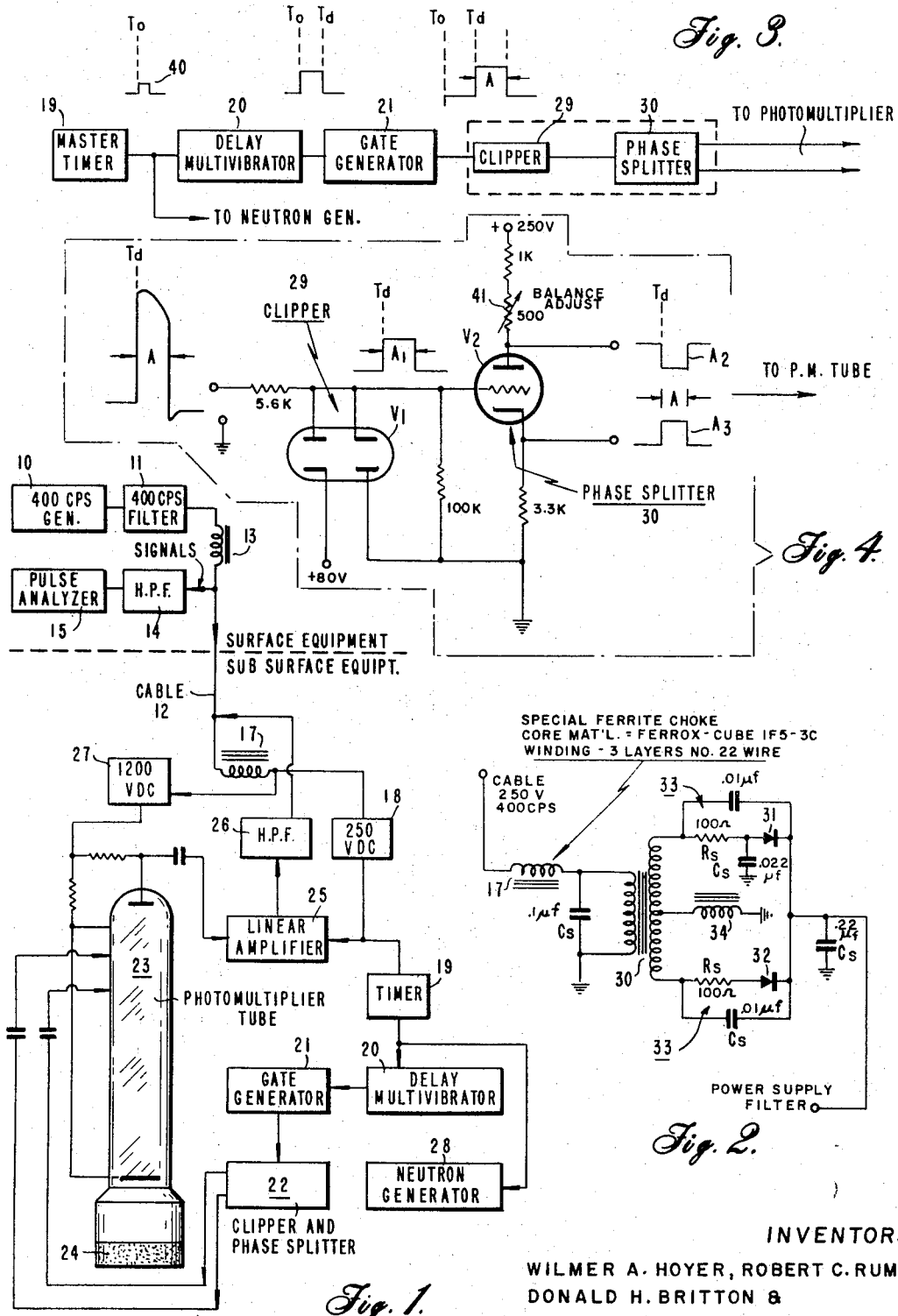

INVENTORS.
WILMER A. HOYER,
ROBERT C. RUMBLE,
DONALD H. BRITTON,
JOHN D. BALL, (DECEASED)
BY VERNA D. BALL (EXECUTRIX)

BY John S. Schneider
ATTORNEY.

GATED SPECTRAL WELL LOGGING RADIATION DETECTION SYSTEM AND METHOD

This is a division of application, Ser. No. 587,943 filed Oct. 14, 1966 now U.S. Pat. No. 3,582,655.

The present invention generally concerns radiation detection systems and methods especially adaptable for use in well logging operations.

An improved technique in radioactivity well logging practices consists of bombarding earth strata and contained fluids with pulses of high energy neutrons and of making spectral analyses of the gamma rays produced by the neutron bombardment.

Since particular elements yield gamma rays of characteristic energies on bombardment by neutrons, spectral analysis of the gamma rays affords a means of identifying the elements present and also of determining their concentrations. With knowledge of the elemental composition of the earth strata, it is possible to determine both the mineralogic character of a subsurface stratum and the nature of its contained fluids.

When earth strata are bombarded continuously with fast neutrons, a portion of the gamma radiation produced results from inelastic scattering reactions and a portion results from neutron capture reactions which take place after the neutrons have lost most of their initial energy. Inelastic scattering interactions occur within a matter of nanoseconds after production of fast neutrons, whereas the time required for the slowing down of fast neutrons to energy levels necessary for capture reactions requires times of tens or hundreds of microseconds. Thus, a pulsing technique permits discrimination between gamma radiation resulting from inelastic scattering reactions and gamma radiation resulting from neutron capture reactions. If fast neutrons are produced in pulses of about 5 microseconds duration with an interpulse interval of several hundred microseconds, then a gated or pulsed gamma ray detector operative for the duration of the neutron pulse and inoperative during the interpulse interval will detect gamma rays which are predominantly from inelastic scattering reactions. Conversely, if the gated detector is turned off during the neutron pulse interval and on during the interpulse interval, it will detect only those gamma rays from neutron capture reactions. Consequently, the use of a pulsed neutron source and a gated gamma ray detector is quite advantageous in segregating gamma radiation from the two categories of neutron reactions.

Since the reactions of the neutrons are very fast, it is important in the operation of this technique that a gated gamma ray detector system operates satisfactorily with sharp turn-on rise and turn-off decay times, high signal-to-noise ratio, good linearity and temperature stability.

A primary object of the present invention, therefore, is to provide improvements in a gamma ray detector type tool which is adapted to be gated to detect gamma rays and to amplify signals resulting from the detected gamma rays and to transmit these signals to the surface where they may be processed and recorded. Another object of the present invention is to provide an improved arrangement of components for a radiation logging tool. A still further object of the present invention is to provide a method of achieving a multiple radiation log with the components of a single radiation logging tool.

In accordance with the present invention, the components of the gated radiation detector system comprise a surface a.c. power source; first subsurface means adapted to change said a.c. power to d.c., which means preferably includes silicon diode full wave rectifiers; a radiation detector adapted to detect and convert gamma rays to electrical signals; an amplifier powered by said d.c. adapted to amplify said signals, which means preferably includes feedback circuits to reduce distortion of the electrical signals and produce a desired amplifier output impedance; means including a timer powered by said d.c. adapted to produce a positive pulse; means to shape said positive pulse and produce two pulses having amplitudes which produce minimum distortion and high on-off ratio of the radiation detector; and second subsurface means adapted to change said a.c. power source to other d.c. adapted to operate said detector. The present invention also includes a system, provided with a radiation logging tool having two gated detectors, that is capable of simultaneous detection of gamma radiation which originates at the same or different times; or simultaneous detection of gamma radiation originating at a particular time and sensing of the magnitude of neutron flux at any predetermined time.

The above objects and other objects and advantages of the invention will be apparent from a more detailed description of the invention when taken with the drawings wherein:

FIG. 1 represents a block diagram of the surface and subsurface equipment used in the nuclear logging tool;

FIG. 2 is a schematic representation of the power supply circuit for the detector system;

FIG. 3 shows a block diagram of the timer and gate generator components of the detector system;

FIG. 4 is a schematic illustration of the clipper and phase splitter portions of the detector circuit;

Figure 5:
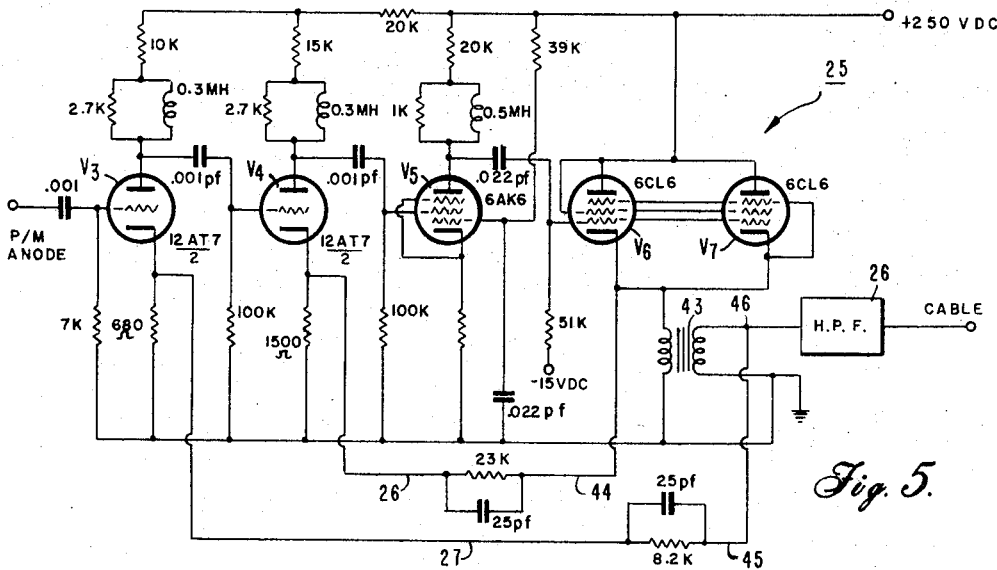
FIG. 5 is a schematic illustration of the linear amplifier circuit of the detector system.

Referring to the components diagrammed in FIG. 1, the surface equipment includes a 400 cps generator 10 for supplying operating current to the detector system and a 400 cps filter 11, coupled to a cable 12 by a ferrite choke 13. Cable 12 also is connected at the surface to a high pass filter 14 and a pulse analyzer 15. Although cable 12 is preferably a single or monoconductor type cable, it may also be of the multiple conductor type.

The subsurface equipment includes a ferrite choke 17 and a downhole power supply 18 (shown in detail in FIG. 2). Choke 13 is the same as choke 17 and is made as in the notation in FIG. 2. Other components of the subsurface equipment, arranged as shown in FIG. 1 with arrows designating the direction of the signals or current, include a timer 19, a delay multivibrator 20, a gate generator 21, and a clipper and phase splitter 22 (shown in detail in FIG. 4). Additional components include a photomultiplier tube 23 provided with a NaI crystal 24, a linear amplifier 25 (shown in detail in FIG. 5), a high pass filter 26, a second power source 27 adapted to supply operating power to the detector photomultiplier tube 23 and a neutron generator and power supply 28. The neutron generator may be suitably a generator such as disclosed in U.S. Pat. No. 3,185,849, issued to W. A. Hoyer et al. The power supply for the neutron generator is preferably of the type shown in U.S. Pat. No. 2,907,900, issued to W. A. Hoyer et al.

The B+ power to operate amplifier 25 and gate generator 21 is derived from a 400 cycle transformer-powered power supply illustrated in FIG. 2. The B+ voltage is obtained by full wave rectification of the transformer secondary winding. Silicon diode rectifiers 31 and 32 convert the 400 cycle a.c. to d.c. in place of vacuum tube-type rectifiers, which results in saving in space, heat generation and power consumption. While the silicon diode rectifiers save space, power and minimize heat generation, their property of changing rapidly from nonconducting to conducting state produces noise spikes in the power line in conductor cable 12 which must be suppressed. The diode noise suppression circuit 33, denoted by resistances $R_s$ and capacitances $C_s$, connected to the ends of the secondary transformer 30, reduces the spikes appearing at the primary of transformer 30. Further reductions in these noise spikes occur across ferrite filter choke 17 which also isolates the photomultiplier signals from the power circuit. The center tap of transformer 30 is grounded through a choke 34.

Inherently poor stability of the 400 cps supply voltage requires regulation of critical power supplies in the tool. Since a change of one percent in the high voltage supply for a photomultiplier will result in a gain shift nearly 10 times as great, stabilization of this voltage is imperative. The photomultiplier power supply 27 is a transformer-powered half wave rectifier with R-C filtering, and regulation is achieved by a series string of 85A2 gaseous regulator tubes. A thermal insulating package houses the regulator and rectifier tubes to provide stabilization under varying conditions of ambient temperature. Output voltage of this supply is regulated to within 0.1 percent of 1,200 volts for the input voltage range of 260 V ± 10 percent.

Gamma rays detected by the NaI (thallium-activated) crystal 24 produce scintillations or weak light flashes, the intensities of which are proportional to the energies of the incident gamma rays. The photomultiplier tube 23 produces a voltage pulse whose amplitude is proportional to the intensity of scintillation; hence, the crystal-photomultiplier combination produces a voltage pulse whose height is proportional to the energy of the gamma ray detected.

A circuit for gating the photomultiplier 23 may be one such as shown and claimed in U.S. Pat. No. 2,951,941, issued to H. R. Brannon, Jr. When it is desired to pulse or gate the photomultiplier tube in order to observe radiations only during the selected time interval, the photomultiplier is made inoperative by biasing one of its dynodes almost to cut-off and to restore operation a positive gate is applied to this dynode. A coincident negative gate may be applied to another dynode for balancing purposes and this dynode is biased slightly positive so that the negative pulse restores normal operating voltage. A circuit of this latter type is shown and described in U.S. Pat. No. 2,911,535, issued to N. L. Muench. The ratio of the output signals during the gate period to those during the off period is about 30:1.

The basic repetition rate is set by master timer 19 whose synchronizing pulse to gate generator 21 is delayed by delay multivibrator 20 so that the detection interval is coincident with the burst of neutrons from neutron generator 28. As seen in FIG. 3, master timer 19, which is a free running oscillator, has an almost square-wave output indicated at 40. The leading edge which occurs at time $T_o$ triggers neutron generator 28 and the trailing edge at time $T_d$ is used to trigger "on" delay multivibrator 20. Such delay is necessary to make the photomultiplier "on" time coincide with the peak neutron production. The pulsed neutron generator has an inherent delay in its operation. The $T_o$ to $T_d$ time is preferably approximately 4 microseconds. Gate generator 21 is triggered by the delay multivibrator 20 at $T_d$ and produces a pulse of length A, as shown. The master timer 19, delay multivibrator 20 and gate generator 21 are commonly used circuitry configurations whose design is described in an appropriate text, such as, "Pulse and Digital Circuits," Millman and Taub, McGraw-Hill, 1956. The clipper 29 and phase splitter 30 circuits are shown in detail in FIG. 4. These circuits function to shape the positive pulse from the gate generator and then to produce two pulses whose amplitudes produce the minimum distortion yet highest on-off ratio of photomultiplier 23. A further feature of these circuits is that both the positive and negative output gates are coincident in time, thereby achieving an effective cancellation of the gating signal at the output of the photomultiplier circuit.

As seen in the circuit of FIG. 4, the gate generator output square wave A is clipped by the double diode tube $V_1$ as indicated at $A_1$ to improve wave form. Both gating pulses $A_2$ and $A_3$ of the photomultiplier are produced from the clipped pulse by means of the phase splitting circuit associated with vacuum tube $V_2$ which includes potentiometer 41 in the plate lead of tube $V_2$. The outpput pulses $A_2$ and $A_3$ as mentioned, are very nearly the same wave form but of opposite polarity which counteract each other in the photomultiplier gating network. Adjustment of potentiometer 41 reduces the transients and off-balance to acceptable signal-to-noise levels.

Amplifier 25 is shown in detail in FIG. 5. Gamma rays converted to electrical pulses by photomultiplier 23 are detected in the NaI crystal 24. The amplitudes of these electrical pulses are proportional to the energy of the detected gamma ray. The electrical signals from the photomultiplier anode are amplified in three amplifier stages provided by the circuit of vacuum tubes $V_3$, $V_4$ and $V_5$, which amplifier stages drive an output stage that is operated nearly at cut-off by the bias supplied to the control grid anode of tubes $V_6$ and $V_7$ which are operated in parallel. The power amplification output stage of vacuum tubes $V_6$ and $V_7$ is coupled to an impedance matching pulse transformer 43 which is especially wound on a grain-oriented silicon steel tape core. An inner feedback loop 44, which couples the cathodes of tubes $V_6$ and $V_4$, minimizes the phase shift, or increases the high frequency response, of the amplifier stages provided by circuit of $V_4$ through $V_6$–$V_7$ so that a large amount of feedback can be applied by feedback loop 45, which couples the output terminal 46 of the secondary of transformer 43 and the cathode of tube $V_3$. The result of these feedback loops is a reduction of distortion of the photomultiplier pulses and an output impedance of the amplifier which achieves the following desired signal-handling properties. Amplifier 25 consumes only about 18 watts power. This is an important aspect in nuclear logging tools, since power is limited downhole ane heat is difficult to dissipate. The amplifier has a low 50 ohm output impedance to match the characteristic impedance of cable 12 (single conductor) and a low, less than one-half ohm, internal impedance so that the amplifier can drive the capacitive reactance of cable 12. The amplifier accepts only negative input signals as from photomultiplier 23 and it has a voltage gain of 20. Amplifier 25 is constructed of simple parts that can easily be fitted in a logging sonde and it is linear to within 2 percent and its linearity is unaffected by a 10 percent change in the supply voltage. High pass filter 26 is a standard constant $k$ high pass filter whose design is determined by commonly known design considerations such as given in "Radio Engineering," Terman, McGraw-Hill, 1947.

A simple change in the values of components of the delay multivibrator would allow the gamma ray detector to remain on during the period between the bursts of neutrons from the neutron generator. Gamma rays detected during this interpulse period are the same as the gamma rays resulting from neutron capture reactions used in ordinary neutron-gamma ray logs common to the art. Also, such gamma rays might be discriminated at 6 mev to record a log commonly known as the chlorine log.

Figure 6:
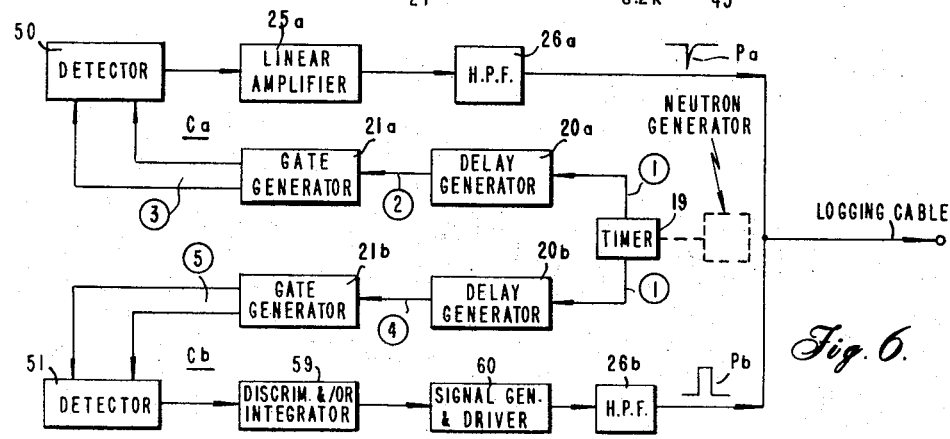
FIGS. 6 and 6A illustrate a modified nuclear detection system.
Figure 6A:
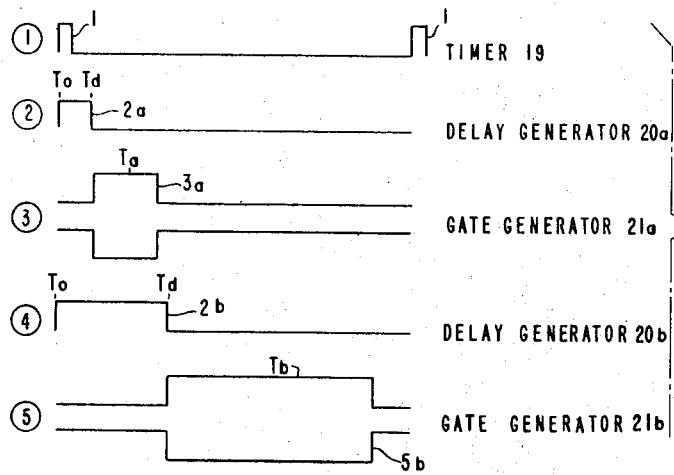

A radiation detection system utilizing the time discrimination advantages of a pulsed neutron source and gated detection system is illustrated in FIGS. 6 and 6A. This system is capable of simultaneous detection of gamma rays originating at two different times in the sequence of pulsed operation of a radiation logging tool. A simultaneous record of gamma rays resulting from inelastic and capture reactions may be made; or, detection of gamma radiation which originates at a specified time may be made while simultaneously sensing the magnitude of neutron flux at any specified time. Various simultaneous radiation logs possible in this system are, for example, a gamma ray spectrum produced from neutron inelastic reactions together with either a neutron capture-gamma ray curve; a neutron curve (thermal or epi-thermal); or a neutron decay time curve. In addition, in each such instance, the spectrum produced from neutron inelastic reactions could be replaced by a record of the number of fast neutrons detected in a specified time period.

As illustrated in FIGS. 6 and 6A, two detectors 50 and 51 are shown positioned in related circuits (upper) $C_a$ and (lower) $C_b$. The numbers associated with the arrowed lines in FIG. 6 correlate with the numbers in FIG. 6A, which are used to designate timing sequences of the detectors. The output pulses 1 generated by timer 19 trigger both delay generators 20a and 20b, respectively, in a desired predetermined timing sequence (see FIG. 6A). Circuit $C_a$ may be of the type described with regard to FIGS. 1–5, which produces pulses or signals indicative of gamma radiation resulting from neutron inelastic reactions. The output pulse 2a from delay generator 20 triggers a gate generator 21a (including clipper and phase splitter) which produces two opposing coincident pulses 3a used to gate detector 50 and provide detection time $T_a$ in conjunction with the timing of a neutron generator (not shown) also controlled by timer 19, as previously discussed in detail with regard to FIGS. 3 and 4. Signals from detector 50 are amplified by amplifier 25a, filtered by high pass filter 26a and transmitted to the logging cable as the short pulse designated $P_a$. Circuit $C_b$ may be of the type used to detect gamma rays resulting from capture neutron reactions or it may be of the type well known in the art used to detect neutrons. For example, detector 51 may be a zinc sulfide (Ag) phosphor which detects fast neutrons or an anthracine crystal which detects thermal neutrons. In the latter instance, a discriminator-integrator could be employed to sense the decay of thermal neutrons. The output pulse 2b from delay generator 20b triggers a gate generator 21b (including clipper and phase splitter) which produces two opposing coincident output pulses 5b used to gate detector 51 and provide detection time $T_d$. The output signals from detector 51 are processed for counts or counting rate such as presented in ordinary neutron-gamma ray logs. In order to achieve such a log, the signals are generally selected within some height band and then either integrated in the logging tool or these signals may cause a signal generator to produce clean constant-type pulses which are transmitted to the surface on the logging cable and easily distinguished at the surface. In either case, some or all of the elements such as discriminator-integrator 59, signal generator and driver 60 and high pass filter 26b may be employed. In certain cases, the discriminator 59 may drive the generator 60 producing pulses going through high pass filter 26b and these signals would be integrated at the surface. The output of the system discriminator-integrator 59, signal generator 60 and high pass filter 26b may be either an analog d.c. voltage or pulses representative of count rate; other analog signals from the integrator such as varying a.c. signals whose amplitudes represent integrated counts could also be employed.

Signal transmission to the surface will not be mixed in the two detector systems. When multiple conductor cables are employed, power and the signals from each detector can be transmitted over noninterfering lines. In the case of use of a single conductor cable, the power can be transmitted down to the logging tools and the signals transmitted up to the surface from each system as shown in FIG. 1, where signals from the separate detectors are of opposite polarity for selection at the surface. Alternatively, the integrator could generate a selected frequency signal whose amplitude would be responsive to the analog signal output or the integrator could produce pulse width modulated signals or frequency modulated signals. Such systems are commercially available units and require no further explanation.

Either circuit $C_a$ or circuit $C_b$ may be repeated or substituted one for the other to achieve a variety of useful combination detection systems.

Typical values of components have been shown in the figures for purposes of illustration. Such component values can be varied and still satisfy the requirements of the present invention as commonly known in the art of electronic design.

Various modifications may be made in the components of the detector circuit described herein and in the arrangement of these components without departing from the spirit and scope of this invention. In this regard, transistor components could be substituted for the vacuum tubes shown and described in the various circuits where the transistors perform analogous functions of the vacuum tubes in such previously described circuits.

Having fully described the nature, objects and operation of our invention, we claim:

1. A radiation detection system for use in nuclear well logging operations comprising:
   an a.c. power source for supplying operating current for said system;
   first means adapted to change said a.c. power to d.c. power;
   second means adapted to change said a.c. power to another d.c. power;
   a radiation detector powered by said other d.c. power adapted to detect gamma rays resulting from neutron bombardment of subsurface formations and convert said gamma rays to electrical signals proportional to energies of said gamma rays;
   gating means for said detector powered by said one d.c. power adapted to produce two coincident opposite polarity pulses having amplitudes which produce minimum distortion of said electrical signals and high on-off ratio of said detector, said gating means including timer means adapted to produce positive pulses at a selected repetition rate and clipper-phase splitter means adapted to shape and split said positive pulses into said two coincident opposite polarity pulses; and
   an amplifier powered by said one d.c. power adapted to amplify the electrical signal output from said detector while preserving the amplitude character of said electrical signals.

2. A method for use in subsurface well logging utilizing a tool comprising first and second gated radiation detectors adapted to be turned "on" during selected time periods to detect and convert radiation to electrical signals and a pulsed neutron generator adapted to produce bursts of neutrons comprising:
   generating timing signals at a selected repetition rate synchronized to gate said detectors and pulse said neutron generator to cause said first and second detectors to be turned "on" at selected time periods relative to said bursts of neutrons;
   gating said first detector "on" coincident with said bursts of neutrons to detect gamma radiation resulting from inelastic scatter reactions and transmitting to the surface electrical signals proportional to energies of said gamma radiation while preserving the energy levels thereof; and
   transmitting to the surface electrical signals indicative of radiation detected and converted by said second detector.

3. A method as recited in claim 2 in which said second detector is "on" only during all or some portion of the interval between said bursts of neutrons to detect gamma radiation resulting from capture reactions.

4. A method as recited in claim 2 in which said second detector detects neutrons.

5. A system as recited in claim 1 in which said first means adapted to change said a.c. power to said d.c. power includes a transformer having silicon diode rectifiers and diode noise suppression circuits comprising resistances and capacitances connected to the ends of the secondary of said transformer.

6. A system as recited in claim 5 in which said clipper and phase splitter circuit includes a double diode tube adapted to improve wave form and a vacuum tube associated with a circuit including a potentiometer in the plate lead of said vacuum tube adapted to reduce noise transients and off-balance to acceptable signal-to-noise levels.

* * * * *